(12) United States Patent
Magomet et al.

(10) Patent No.: US 7,862,845 B2
(45) Date of Patent: Jan. 4, 2011

(54) PROCESS FOR MANUFACTURING A SWEETENER AND USE THEREOF

(75) Inventors: Malsagov Magomet, Kuala Lumpur (MY); Tugan Tomov, Moscow (RU); Timur Somann, Moscow (RU); Varuzhan H Abelyan, Abovian (AM)

(73) Assignee: PureCircle Sdn Bhd, Kuala Lumpur (MY)

( * ) Notice: Subject to any disclaimer, the term of this patent is extended or adjusted under 35 U.S.C. 154(b) by 1180 days.

(21) Appl. No.: 11/246,152

(22) Filed: Oct. 11, 2005

(65) Prior Publication Data

US 2007/0082103 A1    Apr. 12, 2007

(51) Int. Cl.
A23L 1/236    (2006.01)

(52) U.S. Cl. .................. 426/548; 426/478; 426/489

(58) Field of Classification Search .................. 426/478, 426/479, 481, 489, 506, 548
See application file for complete search history.

(56) References Cited

U.S. PATENT DOCUMENTS 4,599,403 A * 7/1986 Kumar ..................... 536/18.1
4,892,938 A * 1/1990 Giovanetto ................. 536/18.5

FOREIGN PATENT DOCUMENTS

JP    58212759    * 12/1983
JP    58212760    * 12/1983

OTHER PUBLICATIONS

Osamu Tanaka, "Improvement of taste of natural sweetners", Pure & Appl. Chem., vol. 69, No. 4, pp. 675-683, 1997.
Shin S. Chang et al., "Stability Studies of Stevioside and Rebaudioside A in Carbonated Beverages", pp. 1-6, Corporate Research and Development Department, The Coca-Cola Company, 1983 American Chemical Society.
T.H. Grenby, "Developments in Sweeteners-3", pp. 1-37, vol. 1 and 2.

* cited by examiner

*Primary Examiner*—Leslie Wong
(74) *Attorney, Agent, or Firm*—Pyprus Pte Ltd

(57) ABSTRACT

Highly purified Stevioside and Rebaudioside A were prepared from sweet glycoside extracts obtained from *Stevia rebaudiana* Bertoni leaves. The resulting sweeteners are suitable as non-calorie, non-cariogenic, non-bitter, non-lingering sweeteners, which may be advantageously applied in foods, beverages, and milk products.

14 Claims, 2 Drawing Sheets

PROCESS FOR MANUFACTURING A SWEETENER AND USE THEREOF

BACKGROUND OF THE INVENTION

1. Field of the Invention

The present invention relates to a process for producing a highly purified Stevioside and Rebaudioside A from the extract of the *Stevia rebaudiana* Bertoni plant and use thereof in various food products and beverages.

2. Description of the Related Art

In view of food sanitation, the use of artificial sweeteners such as dulcin, sodium cyclamate and saccharin has been restricted. However natural sweeteners have been receiving increasing demand. *Stevia rebaudiana* Bertoni is a plant that produces an alternative sweetener that has an added advantage of being a natural plant product. In addition, the sweet steviol glycosides have functional and sensory properties superior to those of many high potency sweeteners.

The sweet diterpene glycosides of *Stevia* have been characterized, and eight sweet glycosides of steviol have been identified. These glycosides accumulate in *Stevia* leaves where they may attain from 10 to 20% of the leaf dry weight. On a dry weight basis, a typical profile for the four major glycosides found in the leaves of *Stevia* includes 0.3% dulcoside, 0.6% Rebaudioside C, 3.8% Rebaudioside A and 9.1% Stevioside. Other glycosides identified within *Stevia* include Rebaudioside B, C, and E, and dulcosides A and B. Rebaudioside B may be an artifact formed from Rebaudioside A during extraction, since both Rebaudioside A and Rebaudioside D are found to convert to Rebaudioside B by alkaline hydrolysis.

Out of four major diterpene glycoside sweeteners present in *Stevia* leaves only two (Stevioside and Rebaudioside A) have physical and sensory properties that are well characterized. Stevioside and Rebaudioside A were tested for stability in carbonated beverages and found to be both heat and pH stable (Chang and Cook, 1983). Stevioside is known to be 110 to 270 times sweeter than sucrose, Rebaudioside A between 150 and 320 times sweeter than sucrose, and Rebaudioside C between 40 and 60 times sweeter than sucrose. Dulcoside A was found to be 30 times sweeter than sucrose (Phillips, 1989 and Tanaka, 1997).

However, apart from its high level of sweetness, they have also intrinsic properties of post-bitter taste and unpleasant and undesirable aftertaste. At present, the main method to improve the taste quality is the enzymatic modification of Stevioside or Rebaudioside A. On the other hand, some undesirable characteristics of glycosides can be as a result of contamination of other substances, presented in extract.

A process for the recovery of diterpene glycosides, including Stevioside from the *Stevia rebaudiana* plant is described (U.S. Pat. No. 4,361,697). A variety of solvents, having different polarities, were used in a sequential treatment that concluded with a high performance liquid chromatographic (HPLC) separation procedure.

A method for the recovery of Rebaudioside A from the leaves of *Stevia rebaudiana* plants has been developed (U.S. Pat. No. 4,082,858). Again, final purification is achieved by liquid chromatography subsequent to an initial extraction with water and an alkanol having from 1 to 3 carbon carbons, preferably methanol. It is also known that water may be used as the initial solvent; their preferred solvent at this stage is a liquid haloalkane having from 1 to 4 carbon atoms. The preferred second solvent is an alkanol having from 1 to 3 carbon atoms, while the preferred third solvent is an alkanol having from 1 to 4 carbon atoms and optionally minor amounts of water.

Individual sweet glycosides can be obtained from the *Stevia rebaudiana* plant. A mixture of sweet glycosides extracted from the *Stevia rebaudiana* plant are processed to remove impurities by using two types of ion-exchangers. After removing the mixed sweet glycosides from the second column with methanol, the solution is dried. Upon refluxing the dried solids in a methanol solution and then cooling the solution, Stevioside precipitates out. The filtrate is further concentrated and cooled to precipitate out Rebaudioside A. This Rebaudioside A can be further purified as can the previously obtained Stevioside (U.S. Pat. No. 5,962,678). However, a large amount of toxic organic solvent, such as methanol is used.

However, all the above-mentioned methods allow the production of not highly purified Stevioside and Rebaudioside A, which further possess a residual bitterness and aftertaste. The bitterness and aftertaste can be eliminated by intermolecular transglycosylation using various enzymes, upon which the attachment of new carbohydrates at positions C13 and C19 takes place. The number of carbohydrate units in the above-mentioned positions determines the quality and degree of that component's sweetness. The process of transglycosylation is described in U.S. Pat. Nos. 4,219,571; 4,590,160; 6,255,557).

On the other hand, highly purified Stevioside and Rebaudioside A can possess an improved taste profile. It is also important to unify the sweeteners specification, because at present in the market there are many types of *Stevia* based sweeteners with different specifications and ratio of glycosides.

As a result, there is a need to provide a commercially valuable process for the manufacturing the highly purified Stevioside and Rebaudioside A from the extract of the *Stevia rebaudiana* Bertoni plant, and use thereof in various beverages and food products.

SUMMARY OF INVENTION

An object of the present invention is to produce a commercially valuable process for producing a highly purified sweetener from the extract of *Stevia rebaudiana* Bertoni plant and use thereof in various food products and beverages, which overcomes the disadvantages of the related art.

The invention, in part, pertains to the dried and powdered leaves being subjected to water extraction and the resulted extract is purified using treatment with a base such as calcium hydroxide and then iron chloride. The filtrate was deionized on, e.g., Amberlite FPC23 H, Amberlite FPA51, and Amberlite FPA98Cl. The filtrate is then concentrated syrup under vacuum and spray dried. The isolation and purification of Stevioside and Rebaudioside A were developed using alcoholic precipitation and ultrafiltration. The highly purified Stevioside and Rebaudioside A were obtained. Any type of existing *Stevia* extract with various ratio of sweet glycosides are feasible.

The sweeteners obtained were applied in various foods and beverages as sweetener.

The invention, in part, pertains to a purified sweet glycosides extract produced from the Stevia rebaudiana plant, wherein the main sweet glycosides are Rebaudioside A and Stevioside compounds, obtained by a process including drying Stevia rebaudiana leaves, treating the leaves to extract an aqueous liquid solution containing mixed sweet glycosides, extracting the Stevia rebaudiana leaves, obtaining an extract, filtering the extract, obtaining a filtrate, treating the filtrate with a base such as calcium hydroxide, treating the extract with trivalent iron chloride, desalting, decolorizing, and evaporating the filtrate to dryness.

In the invention, purified Rebaudioside A and Stevioside can be obtained by dissolving sweet glycosides in methanol at ambient temperatures to precipitate Stevioside, filtering the solution to recover a precipitate of Stevioside, purifying, recovering a high purity Stevioside, concentrating the remaining solution and evaporating to dryness, suspending the powder in ethanol, heating and then cooling the solution to precipitate Rebaudioside A. Suspending the crystalline Rebaudioside A obtained in ethanol-water solution at cool conditions (10-12° C.) prepares a high purity of Rebaudioside A. Stevioside or Rebaudioside A has a purity of at least 98%. Applications are found in various foods such as chocolate, ice cream, beverage, dairy products, as a sweetener in a tablet form.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION

Figure 1:
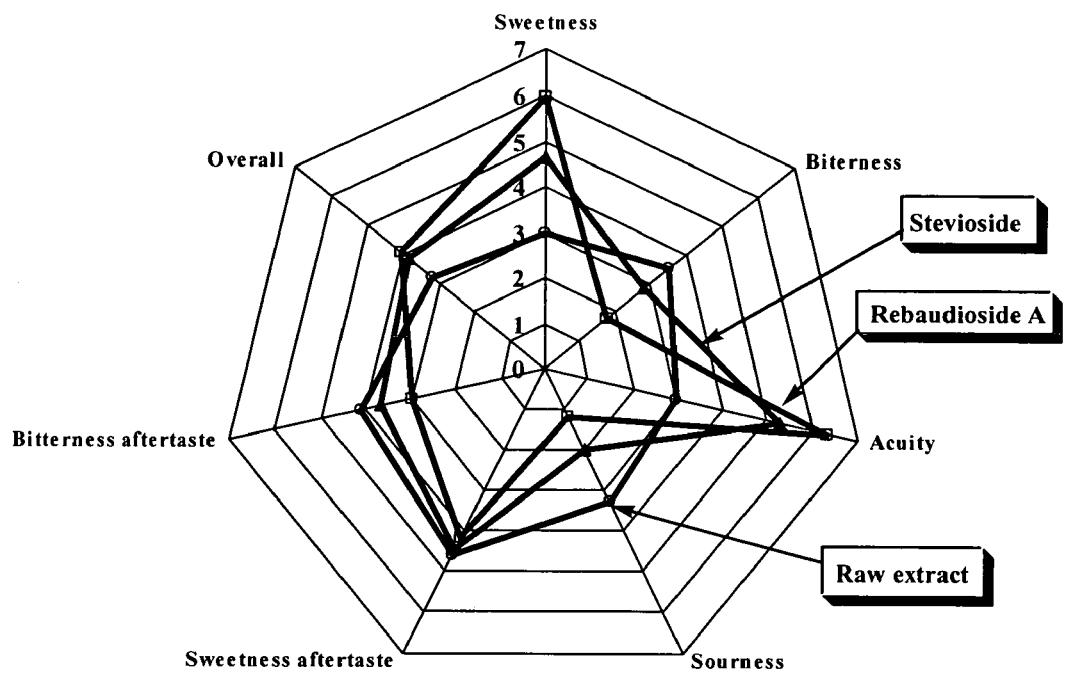
FIG. 1 shows a sensory evaluation of raw Stevia extract, Stevioside, and Rebaudioside A.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The dried leaves of Stevia rebaudiana Bertoni were extracted by 10 volumes of water. The proportion of extraction water preferably was about 5 liters to about 15 liters (pH 6.0 to 7.0) to one kilogram of leaves. Greater volumes of solvent can be used, however, it was not preferable from the practical standpoint. The duration of extraction may be from 0.5 hours to 24 hours, with a period of from about 1 hours to about 6 hours preferred.

The extraction temperature can be in the limits of 25-90° C., however the temperatures between 45-75° C. are more preferable.

The plant material was separated from the solution by filtration, and the pH of the filtrate was adjusted to about 10 with calcium hydroxide and heated between 40-60° C., preferably from 50° C. to 55° C., for about 0.5-1.0 hours, cooled to ambient temperature with slow agitation, and neutralized by $FeCl_3$. After mixing for 10-15 minutes, the precipitate was removed by filtration, the filtrate was passed through the Celite, deionized, and decolorized by Amberlite FPC23 H, Amberlite FPA51, and Amberlite FPA98Cl by conventional manner. The solution was concentrated and spray dried.

The yellow powder had a content of 3.4% Dulcoside, 64.6% Stevioside, 6.7% Rebaudioside C and 25.3% Rebaudioside A.

An HPLC analysis of the obtained product was carried out using an Agilent Technologies 1100 Series (USA) equipped with Zorbax-$NH_2$ column using acetonitrile-water gradient from 80:20, v/v (2 minutes) to 50:50, v/v during 70 minutes and UV detector at 210 nm.

The obtained powder was dissolved in methanol and maintained at a temperatures 20-50° C., preferably at 20-25° C., for 0.5-6.0 hours, preferably 0.5-1.0 hours with agitation. The proportion of extract and methanol was between 1:2-1:7, w/v, preferably 1:5. During this time the precipitate was formed, which was filtered and dried. According to the HPLC analysis, the powder contents were around 90-91% of Stevioside. A second treatment by methanol was not efficient to prepare high purity Stevioside.

For the further purification, the powder was mixed with two volumes of 90% of ethanol and at 10-12° C. and maintained for about 30 minutes with slow agitation. The precipitate was separated by filtration and dried under vacuum. The Stevioside with about 98.5-99.4% purity was obtained.

The liquid filtrates were combined and used for recovery of Rebaudioside A. For this purpose the remaining solution was evaporated to remove the methanol, the syrup obtained diluted with water and passed through polysulfone based ultrafiltration membranes (with a filtering discrimination of 2.5 kDa) (Liumar Technologies, Ottawa, Canada) with diafiltration. The filtrate was concentrated and spray dried. The obtained powder was mixed with 96.2% ethanol and maintained at 45-50° C. for about 30 minutes with agitation. The proportion of syrup and ethanol was between 1:2-1:7, w/v, preferably 1:5. During this time the precipitate was formed, which was filtered and dried. Rebaudioside A with 88-90% purity was obtained. For the further purification the powder was mixed with two volumes of 92% ethanol and maintained at 10-12° C. for about 60 minutes with slow agitation. The crystals were filtered and dried. Rebaudioside A with 98.9% purity was obtained.

Based on the results of preliminary test on the sweetening power of the sweeteners, aqueous solutions of commercial *Stevia* extract (0.05%) commercialized by Ganzhou Julong High-Tech Food Industry Co., Ltd (China), Stevioside (0.07%), and Rebaudioside A (0.028%) were prepared.

The organoleptic test was carried out with 30 previously trained panel members. It was observed that Rebaudioside A has the highest sweetness level (5.96), followed by Stevioside with a mean score of 4.62, and commercial *Stevia* extract had the lowest mean score of 2.96. Rebaudioside A had the lowest score for bitterness (1.76), and commercial *Stevia* extract was the most bitter compared to the other samples. For overall acceptability, Rebaudioside A had the highest score of 4.05 followed by Stevioside (3.81) and raw extract (3.16) (FIG. 1).

Figure 2:
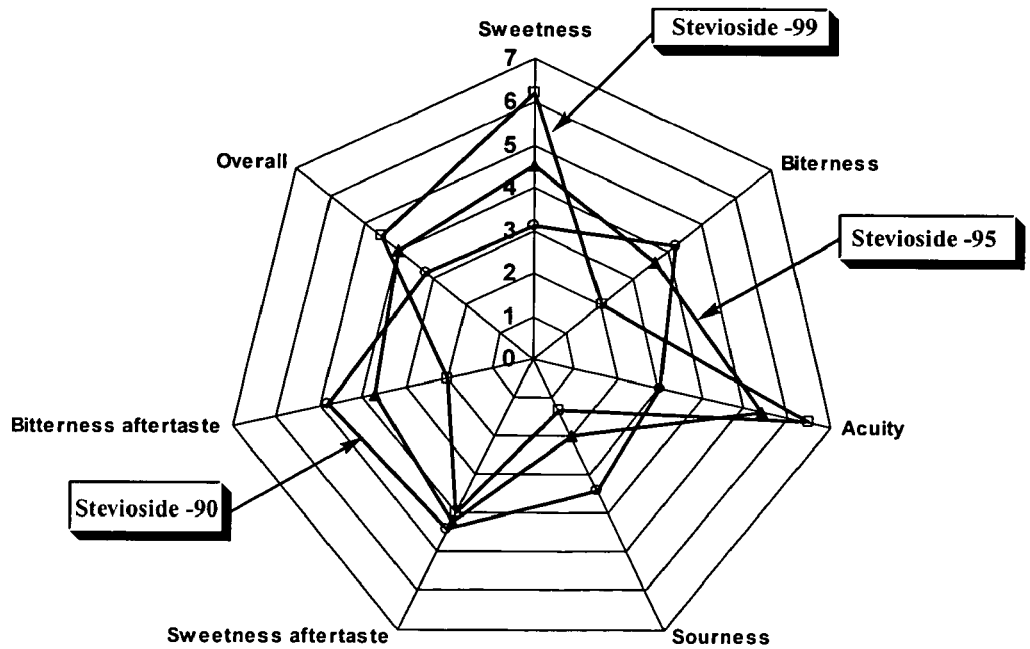
FIG. 2 shows a sensory evaluation of Stevioside with a different grade of purity.
Figure 3:
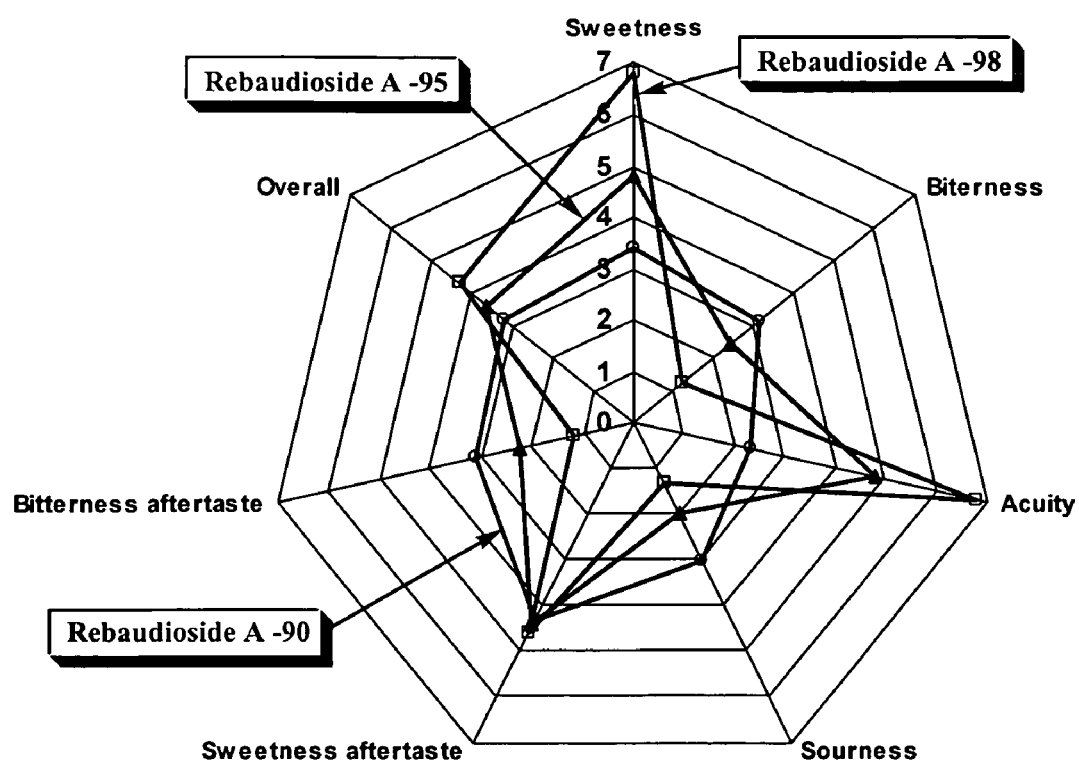
FIG. 3 shows a sensory evaluation of Rebaudioside A with a different grade of purity.

The taste profile of Stevioside with 99.3% of purity was more preferable as compared with 90.2 and 95.4% (FIG. 2). The similar feature was obtained for Rebaudioside A with various grades of purity (FIG. 3).

The highly purified sweeteners can be favorably used for seasoning various food products (for instance, soy sauce, soy sauce powder, soy paste, soy paste powder, dressings, mayonnaise, vinegar, powdered vinegar, bakery products and confectioneries, frozen-desserts, meat products, fish-meat products, potato salad, bottled and canned foods, fruit and vegetables) in intact or mixed forms with other sweeteners, such as corn syrup, glucose, maltose, sucrose, lactose, aspartame, saccharin, sugar alcohols, organic and amino acids, flavors and/or coloring agents.

The products are favorably usable as a low-cariogenic and low-calorie sweetener because it is less fermentable by oral dental-caries causative microorganisms. Exemplary applications include low-cariogenic food products such as confectioneries including chewing gum, chocolate, biscuits, cookies, toffee and candy. Additionally applications include soft drinks such as coffee, cocoa, juice, carbonated drinks, sour milk beverage, yogurt drinks and alcoholic drinks, such as brandy, whisky, vodka and wine. In addition to the above-described uses, the sweeteners are usable for sweetening drugs and cosmetics.

The following examples illustrate preferred embodiments of the invention.

Example 1

Extraction of Sweet Glycosides

The leaves of *Stevia rebaudiana* are dried at 55° C. for three hours in a vacuum oven and powdered (30 mesh). One kg of the obtained material was mixed with 10 liters of water (pH 6.5) and heated to 55° C. with slow agitation for 10 hours. The plant material was separated from the solution by filtration and the pH of the filtrate was adjusted to 10 with about 24 grams of calcium hydroxide and heated to 50° C. for 0.5 hours. The obtained mixture was cooled to ambient temperature and the pH was adjusted to about 7.0 by about 53 grams of $FeCl_3$. After mixing for 15 minutes the precipitate was removed by filtration.

The slightly yellow filtrate was passed through the Celite, deionized, and decolorized by conventional manner on Amberlite FPC23 H, Amberlite FPA51, and Amberlite FPA98Cl commercialized by ROHM & HAAS Co., Germany. The solution was concentrated and spray dried. The yield was 122 grams of powder with a content of sweet glycosides to about 91%. The mixture contains 3.4% Dulcoside, 64.6% Stevioside, 6.7% Rebaudioside C and 25.3% Rebaudioside A.

Example 2

Preparation of Stevioside 100 grams (on the base of dry material) of the powder obtained by the process of EXAMPLE 1 was mixed with 0.5 liters of methanol and maintained at 25° C. for 45 minutes with slow agitation. The precipitate Stevioside was filtered and dried. 61.2 grams of Stevioside with 90.6% purity was obtained.

For the further purification the powder was mixed with two parts of 90% of ethanol, and maintained at 10-12° C. for about 30 minutes with slow agitation. The precipitate was separated by filtration and dried under vacuum. The product weighed 58.8 grams and contained 99.3% Stevioside.

Example 3

Preparation of Rebaudioside A

The remaining solutions after separation of Stevioside (EXAMPLE 2) were combined, and methanol was removed by evaporation. The syrup was diluted with water and passed through polysulfone based ultrafiltration membranes (with a filtering discrimination of 2.5 kDa) (Liumar Technologies, Ottawa, Canada) with diafiltration. The filtrate was concentrated and spray dried. 40.8 grams of powder with content of Rebaudioside A of around 60% were obtained. The powder was mixed with five volumes (w/v) of 96.2% ethanol and maintained at 50° C. for 30 minutes with slow agitation. The precipitate was filtered and dried. Rebaudioside A with 89.8% purity was obtained. The powder was mixed with two volumes of 92% of ethanol and maintained at 12° C. for 60 minutes with slow agitation. The crystals were filtered and dried. 23.6 grams of Rebaudioside A of 98.9% purity was obtained.

Example 4

Low-calorie Orange Juice Drink

Orange concentrate (35%), citric acid (0.38%), ascorbic acid (0.05%), sodium benzoate (0.02%), orange red color (0.01%), orange flavor (0.20%), and sweetener (0.06%) containing 90.2, 95.4 or 99.3% of Stevioside, or 80, 90, or 98.9% of Rebaudioside A were blended and dissolved completely in the water (up to 100%) and pasteurized. The sensory evaluation of the samples are summarized in the TABLE 1. The data shows that best results were obtained for highly purified Rebaudioside A and Stevioside.

TABLE 1

| Sample | Comments | | |
|---|---|---|---|
| | Flavor | Aftertaste | Mouth feel |
| Stevioside—90.2% | Sweet and balanced flavor | Slight bitterness in aftertaste | Acceptable |
| Stevioside—95.4% | Sweet and balanced flavor | Slight bitterness in aftertaste | Acceptable |
| Stevioside—99.3% | Sweet, pleasant, balanced flavor | Clean, no bitterness | Quite full |
| Rebaudioside A—80.0% | Sweet, rounded and balanced flavor | Almost no any bitterness | Acceptable |
| Rebaudioside A—90.0% | Sweet, rounded and balanced flavor | Almost no any bitterness | Full |
| Rebaudioside A—98.9% | High quality of sweetness, pleasant, taste similar to sucrose, balanced flavor | Clean, no unpleasant aftertaste | Quite full |

By the same way can be prepared juices from other fruits, such as apple, lemon, apricot, cherry, pineapple, etc.

Example 5

Low-Calorie Carbonated Lemon-Flavored Beverage

The formula for the beverage was as below:

| Ingredients | Quantity, kg |
|---|---|
| Sugar | 30.0 |
| Sweetener | 0.4 |
| Citric acid | 2.5 |
| Green tea extract | 25.0 |
| Salt | 0.3 |
| Lemon tincture | 10.0 L |
| Juniper tincture | 8.0 L |
| Sodium benzoate | 0.17 |
| Carbonated water | up to 1000 L |

Sensory and physicochemical characteristics of the drink are presented in the TABLE 2.

The drinks with highly purified Rebaudioside A and Stevioside were superior with an excellent flavor and taste.

TABLE 2

| Item | Characteristics | | | |
|---|---|---|---|---|
| | Stevioside—90.2% | Stevioside—99.3% | Rebaudioside A—90.0% | Rebaudioside A—98.9% |
| Appearance | Transparent liquid, free of sediment and strange impurities. A light opalescence, caused by features of used raw materials is possible. | Transparent liquid, free of sediment and strange impurities. A light opalescence, caused by features of used raw materials is possible. | Transparent liquid, free of sediment and strange impurities. A light opalescence, caused by features of used raw materials is possible. | Transparent liquid, free of sediment and strange impurities. A light opalescence, caused by features of used raw materials is possible. |
| Color | From light yellow up to yellow | From light yellow up to yellow | From light yellow up to yellow | From light yellow up to yellow |
| Taste | Sour-sweet, some bitterness in aftertaste | Sour-sweet, expression of sweetness is rapid. The taste is satisfactory. | Sour-sweet, almost no any bitterness, expression of sweetness is rapid. | Sour-sweet, expression of sweetness is rapid. |

Example 6

Low-Calorie Carbonated Drink

The formula for the beverage was as below:

| Ingredients | Quantity, % |
| --- | --- |
| Cola flavor | 0.340 |
| Phosphoric acid (85%) | 0.100 |
| Sodium citrate | 0.310 |
| Sodium benzoate | 0.018 |
| Citric acid | 0.018 |
| Sweetener | 0.030 |
| Carbonated water | to 100 |

The beverages prepared with different sweeteners were given to 10 judges for comparison.
TABLE 3 shows the results.

TABLE 3

| | Number of panelists | | | |
| --- | --- | --- | --- | --- |
| Comparison Point | Stevioside—90.2% | Stevioside—99.3% | Rebaudioside A 90.0% | Rebaudioside A 98.9% |
| Bitter taste | 6 | 2 | 3 | 0 |
| Astringent taste | 6 | 2 | 3 | 0 |
| Aftertaste | 6 | 2 | 3 | 0 |
| Quality of sweet taste | Sweet, bitterness in aftertaste (6 of the 10 judges) | Clean (7 of the 10 judges) | Sweet, some bitterness in aftertaste (5 of the 10 judges) | Clean (10 of the 10 judges) |
| Overall evaluation | Satisfactory (5 of the 10 judges) | Satisfactory (8 of the 10 judges) | Satisfactory (8 of the 10 judges) | Satisfactory (10 of the 10 judges) |

The above results show that the beverages prepared using highly purified Stevioside and Rebaudioside A possessing good organoleptic characteristics.

Example 7

Chocolate

A composition containing 30 kg of cacao liquor, 11.5 kg of cacao butter, 14 kg of milk powder, 44 kg of sorbitol, 0.1 kg of salt, and 0.1 kg of sweetener as in EXAMPLE 5, was kneaded sufficiently, and the mixture was then placed in a refiner to reduce its particle size for 24 hours. Thereafter, the content was transferred into a conche, 300 grams of lecithin was added, and the composition was kneaded at 50° C. for 48 hours. Then, the content was placed in a shaping apparatus, and solidified.

The products are low-cariogenic and low-calorie chocolate with excellent texture. Also, the organoleptic test carried out with 20 panelists revealed no lingering after-taste. The most desirable ones were the products with Rebaudioside-98.9% (19 members) and Stevioside 99.3% (16 members).

Example 8

Ice-Cream 1.50 kg of whole milk were heated to 45° C., and 300 grams of milk cream, 100 grams of tagatose, 90 grams of sorbitol, 6 grams of carrageenan as a stabilizer, 3 grams of polysorbate-80 as an emulsifier, and 1.0 gram of sweetener as in EXAMPLE 5, were added into the milk and was stirred until the ingredients completely dissolved. The mixture then was pasteurized at a temperature of 80° C. for 25 seconds. The homogenization of the obtained mixture was carried out at a pressure of 800 bars and the samples were kept at a temperature of 4° C. for 24 hours to complete the aging process. Vanilla flavor (1.0% of the mixture weight) and coloring (0.025% of the mixture weight) are added into the mixture after aging. The mixture was then transferred to ice cream maker to produce ice cream automatically. Samples of ice creams produced were transferred to seal containers and were kept in the freezer at a temperature of −18° C.

The application of sweeteners does not affect the physico-chemical properties of ice cream, as well as the overall attributes of color, smoothness, surface texture, air cell, vanilla aroma intensity, vanilla taste, chalkiness, iciness and melting rate. Organoleptic test carried out with 20 panelists. The most desirable ones were the products with 98.9% Rebaudioside A (18 members) and 99.3% Stevioside (14 members).

Example 9

Yogurt

In 5 kg of defatted milk, 4.0 grams of sweetener, prepared according to EXAMPLES 2, 3, 4 or 5, were dissolved. After pasteurizing at 82° C. for 20 minutes, the milk was cooled to 40° C. A starter in amount of 150 grams was added and the mixture was incubated at 37° C. for 6 hours. Then, the fermented mass was maintained at 10-15° C. for 12 hours.

The product is a low-calorie and low-cariogenic yoghurt without foreign taste and odor.

Example 10

Tablet

A mixture, consisting of 58.5% lactose, 10% calcium silicate, 5% cross-carmellose, 5% L-leucine, 1% aerosol 200, 0.5% magnesium stearate, and 20% of a sweetener, obtained according to the EXAMPLE 5, was kneaded sufficiently. Then the mixture was shaped with the use of a tabletting machine, equipped with punchers of 6.2 mm diameter, into tablets of 70 mg each, 3.0 mm thick, and 10±1 kg hardness The tablets can be easily administered due to their appropriate sweetness. However, the formulations using low grade of Stevioside and Rebaudioside A were somewhat sticky with solubility about 3-4 minutes in water at 25° C. The tablets, prepared with highly purified Rebaudioside A show the best characteristics with the solubility around 20-30 seconds.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

What is claimed is:

1. A process for producing a sweetener, comprising of the following steps:
   a) drying *Stevia rebaudiana* leaves;
   b) treating the dried *Stevia rebaudiana* leaves with water to extract sweet glycosides, wherein a leaves-water mixture is formed;
   c) filtering the leaves-water mixture to obtain an aqueous filtrate;
   d) directly treating the aqueous filtrate with calcium hydroxide or calcium oxide to raise the pH of the aqueous filtrate to about 10;
   e) directly neutralizing the treated aqueous filtrate with trivalent iron chloride; and
   f) filtrating the neutralized aqueous filtrate to obtain a filtrated aqueous filtrate, and evaporating the filtrated aqueous filtrate to dryness to obtain purified sweet glycosides.

2. The process of claim 1, wherein the treating step (b) is performed with a water content of at least 5 to 15 liters per 1 kg of dry leaves, a treating time is 0.5-24 hours and a temperature range is between 25-90° C.

3. The process of claim 2, wherein the treating time is 1-6 hours.

4. The process of claim 2, wherein the treating temperature range is 45-75° C.

5. The process of claim 1, wherein the treating the extract with base step (d) is performed at a temperature range from 40° C. to 60° C. for 0.5-1 hours.

6. The process of claim 5, wherein the step (d) temperature range is 50-55° C.

7. A purification process for Rebaudioside A and Stevioside, which comprises the following steps:
   a) dissolving the purified sweet glycosides of claim 1 in methanol at temperatures 20-50° C. in an amount of 1:2-1:7 (w/v) to precipitate Stevioside from solution;
   b) filtering the solution from step (a) to recover the precipitate of Stevioside;
   c) suspending the precipitate of Stevioside obtained in step (b) in an alcohol-water solution to further purify the Stevioside; and
   e) recovering the higher purity of Stevioside with a purity of at least 98%.

8. The process of claim 7, wherein the step (c) was performed at 10-12° C.

9. The process of claim 7, which further comprises:
   combining remaining alcohol solutions;
   removing the alcohol;
   ultrafiltering to obtain a filtrate; and
   recovering the Rebaudioside A.

10. The process of claim 9, wherein the step of removing the alcohol is performed by evaporation.

11. The process of claim 9, wherein the recovering the Rebaudioside A step comprises:
    drying the ultrafiltration filtrate;
    mixing with an alcohol solution;
    filtering and drying.

12. The process of claim 11, wherein the mixing with an alcohol solution step uses 96.2% ethanol at 50° C. for 30 minutes.

13. The process of claim 11, which further comprises:
    mixing with dilute alcohol; and
    filtering and drying;
    wherein the Rebaudioside A has a purity of at least 98%.

14. The process of claim 13, wherein the mixing with dilute alcohol step is performed with 92% ethanol at 12° C. for 60 minutes.

* * * * *